United States Patent [19]

Nitta et al.

[11] Patent Number: 5,719,793
[45] Date of Patent: Feb. 17, 1998

[54] RECURSIVE NOISE REDUCTION DEVICE HAVING IMPROVED ADAPTABILITY WITH RESPECT TO INPUT IMAGE DATA

[75] Inventors: Keiichi Nitta, Tokyo; Hirofumi Hidari; Takashi Matsukuma, both of Kawasaki, all of Japan

[73] Assignee: Nikon Corporation, Tokyo, Japan

[21] Appl. No.: 653,972

[22] Filed: May 28, 1996

Related U.S. Application Data

[63] Continuation of Ser. No. 356,129, Dec. 15, 1994, abandoned.

[30] Foreign Application Priority Data

Dec. 15, 1993 [JP] Japan ............... 5-342188

[51] Int. Cl.$^6$ ............... H04N 5/213
[52] U.S. Cl. ............... 364/574; 348/607; 348/620
[58] Field of Search ............... 348/71, 223, 270, 348/607, 620

[56] References Cited

U.S. PATENT DOCUMENTS

| | | | |
|---|---|---|---|
| 4,240,106 | 12/1980 | Michael et al. | 358/36 |
| 4,246,382 | 1/1981 | Honda et al. | 536/79 |
| 4,369,299 | 1/1983 | Honda et al. | 526/329.7 |
| 4,926,084 | 5/1990 | Furutsu et al. | 310/316 |
| 5,140,424 | 8/1992 | Yoshimura et al. | 358/167 |
| 5,396,346 | 3/1995 | Nakayama et al. | 358/448 |

FOREIGN PATENT DOCUMENTS

| | | |
|---|---|---|
| 59-17580 | 4/1984 | Japan . |
| 3-266565 | 11/1991 | Japan . |
| 4-127653 | 5/1992 | Japan . |
| 4-176019 | 6/1992 | Japan . |
| 4-354272 | 12/1992 | Japan . |

*Primary Examiner*—James P. Trammell
*Assistant Examiner*—Kaminis S. Shah

[57] ABSTRACT

A recursive noise reduction device which has adaptability with respect to changes in input image data which are not noise, resulting from, e.g., scene changes and subject movement, and in which a rise in the black level and a drop in the white level does not occur. The recursive noise reduction device includes a storage unit which stores image signals in field or frame units, and a computation unit which multiplies by an input image signal A by K ($0<K<1$), and multiplies by ($1-K$) an image signal B from a previous recursive calculation, which is output from the storage unit. The computation unit adds the input image signal A, which has been multiplied by K, to the signal B, which has been multiplied by ($1-K$), and the computation results are stored in the storage unit. A comparison device compares the signal A with the signal B. The value obtained by rounding the result of the addition upward to the next whole number is considered the computation result when $A>B$, and the value obtained by rounding the result of the addition downward to the next whole number is considered the computation result when $A<B$. The comparison device and the computation unit may comprise a Look-up Table.

15 Claims, 6 Drawing Sheets

FIG. 1

| LUT ADDRESS | | LUT DATA |
|---|---|---|
| INPUT TERMINAL INPUT | MEMORY OUTPUT | MEMORY INPUT |
| 0 | 0 | 0 |
| 0 | 1 | 0 |
| ⋮ | ⋮ | ⋮ |
| 1 | 0 | 1 |
| 1 | 1 | 1 |
| 1 | 2 | 1 |
| 1 | 3 | 2 |
| 1 | 4 | 3 |
| 1 | 5 | 4 |
| 1 | 6 | 5 |
| 1 | 7 | 6 |
| 1 | 8 | 7 |
| 1 | 9 | 8 |
| 1 | 10 | 9 |
| 1 | 11 | 10 |
| 1 | 12 | 11 |
| 1 | 13 | 12 |
| 1 | 14 | 13 |
| 1 | 15 | 14 |
| 1 | 16 | 15 |
| 1 | 17 | 16 |
| 1 | 18 | 17 |
| 1 | 19 | 18 |
| 1 | 20 | 19 |
| 1 | 21 | 20 |
| 1 | 22 | 21 |
| 1 | 23 | 22 |
| 1 | 24 | 23 |
| 1 | 25 | 24 |
| 1 | 26 | 25 |
| 1 | 27 | 26 |
| 1 | 28 | 27 |
| 1 | 29 | 28 |
| 1 | 30 | 29 |
| 1 | 31 | 30 |
| ⋮ | ⋮ | ⋮ |
| 255 | 255 | 255 |

$255 \xrightarrow{1/2} 128 \xrightarrow{1/3} 85 \xrightarrow{1/4} 64 \xrightarrow{1/5} 51 \xrightarrow{1/6} 43 \xrightarrow{1/7} 37$ $\xrightarrow{1/8} 32 \xrightarrow{1/9} 28 \xrightarrow{1/10} 25 \xrightarrow{1/11} 23 \xrightarrow{1/12} 21 \xrightarrow{1/13} 19$ $\xrightarrow{1/14} 18 \xrightarrow{1/15} 17 \xrightarrow{1/16} 16 \xrightarrow{1/17} 15 \xrightarrow{1/18} 14 \xrightarrow{1/19} 13$ $\xrightarrow{1/20} 12 \xrightarrow{1/21} 11 \xrightarrow{1/22} 11 \xrightarrow{1/23} 11 \xrightarrow{1/24} 11 \xrightarrow{1/25} 11$ $\xrightarrow{1/26} 11 \xrightarrow{1/27} 11 \xrightarrow{1/28} 11 \xrightarrow{1/29} 11 \xrightarrow{1/30} 11 \cdots$

FIG. 6

$255 \xrightarrow{1/2} 127 \xrightarrow{1/3} 84 \xrightarrow{1/4} 63 \xrightarrow{1/5} 50 \xrightarrow{1/6} 41 \xrightarrow{1/7} 35$ $\xrightarrow{1/8} 30 \xrightarrow{1/9} 26 \xrightarrow{1/10} 23 \xrightarrow{1/11} 20 \xrightarrow{1/12} 18 \xrightarrow{1/13} 16$ $\xrightarrow{1/14} 14 \xrightarrow{1/15} 13 \xrightarrow{1/16} 12 \xrightarrow{1/17} 11 \xrightarrow{1/18} 10 \xrightarrow{1/19} 9$

$\xrightarrow{1/20} 8 \xrightarrow{1/21} 7 \xrightarrow{1/22} 6 \xrightarrow{1/23} 5 \xrightarrow{1/24} 4 \xrightarrow{1/25} 3$ $\xrightarrow{1/26} 2 \xrightarrow{1/27} 1 \xrightarrow{1/28} 0 \xrightarrow{1/29} 0 \xrightarrow{1/30} 0 \cdots$

FIG. 8
PRIOR ART

| LUT ADDRESS | | LUT DATA |
|---|---|---|
| INPUT TERMINAL (1) INPUT | MEMORY (5) OUTPUT | MEMORY (5) INPUT |
| 0 | 0 | 0 |
| 0 | 1 | 1 |
| : | : | : |
| 1 | 0 | 0 |
| 1 | 1 | 1 |
| 1 | 2 | 2 |
| 1 | 3 | 3 |
| 1 | 4 | 4 |
| 1 | 5 | 5 |
| 1 | 6 | 6 |
| 1 | 7 | 7 |
| 1 | 8 | 8 |
| 1 | 9 | 9 |
| 1 | 10 | 10 |
| 1 | 11 | 11 |
| 1 | 12 | 12 |
| 1 | 13 | 13 |
| 1 | 14 | 14 |
| 1 | 15 | 15 |
| 1 | 16 | 16 |
| 1 | 17 | 17 |
| 1 | 18 | 17 |
| 1 | 19 | 18 |
| 1 | 20 | 19 |
| 1 | 21 | 20 |
| 1 | 22 | 21 |
| 1 | 23 | 22 |
| 1 | 24 | 23 |
| 1 | 25 | 24 |
| 1 | 26 | 25 |
| 1 | 27 | 26 |
| 1 | 28 | 27 |
| 1 | 29 | 28 |
| 1 | 30 | 29 |
| 1 | 31 | 30 |
| : | : | : |
| 255 | 255 | 255 |

RECURSIVE NOISE REDUCTION DEVICE HAVING IMPROVED ADAPTABILITY WITH RESPECT TO INPUT IMAGE DATA

This application is a continuation of application Ser. No. 08/356,129, filed Dec. 15, 1994, now abandoned.

BACKGROUND OF THE INVENTION

1. Field of the Invention

The present invention relates to a recursive noise reduction device, and, more particularly, to a recursive noise reduction device used to reduce the noise of still images and still areas of moving images having improved adaptability to input image data which is not noise.

2. Description of the Related Art

Figure 7:
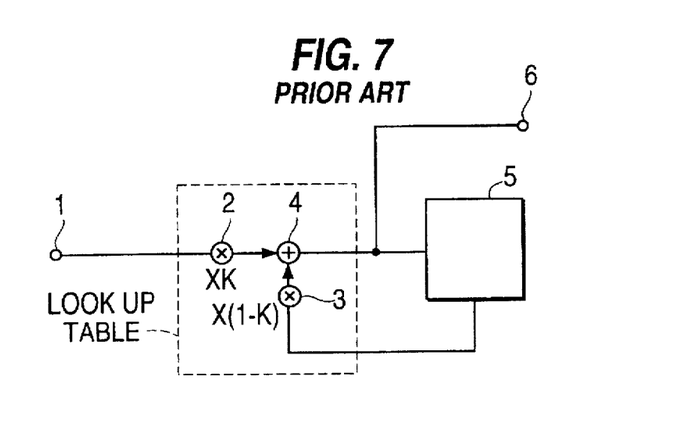
FIG. 7 is a block diagram of a conventional recursive noise reduction device.

Recursive noise reduction devices are known which perform a recursive noise reduction operation for image data processing. For example, FIG. 7 illustrates a conventional recursive noise reduction device having an input terminal 1, multiplication units 2, 3, and addition unit 4, a memory 5 which stores digitized image data (a frame memory or a field memory), and an output terminal 6. In operation of the conventional recursive noise reduction device shown in FIG. 7, the multiplication unit 2 multiplies digital image data corresponding to an image frame (or field) input via input terminal 1 by a coefficient K. The multiplication unit 3 multiplies, by a coefficient 1−K, digital image data from identical picture elements (frames or fields) of a previous recursive calculation stored in the memory 5. The results of the multiplication by multiplication units 2 and 3 are added by the addition unit 4, and the result of the addition is written to the memory 5. The result of the addition by addition unit 4 is also output from the output terminal 6.

When the value of K is 1, the conventional recursive noise reduction device is in a so-called "screen through" mode in which the image data input via the input terminal 1 is output "as is" from the output terminal 6 simultaneously with the input data being stored in the memory 5. When the value of K is 0, the conventional recursive noise reduction device is in a so-called "screen freeze" mode in which the image data stored in the memory 5 is output from the output terminal 6 "as is." When 0<K<1, noise reduction of the image data input via the input terminal 1 is performed.

Further, a conventional recursive noise reduction device is known in which the multiplication units 2, 3 and the addition unit 4 are replaced with a "Look-Up Table" (hereinafter referred to as LUT) which is shown surrounded by a dashed box in FIG. 7. The LUT may be stored in read only memory (ROM) or random access memory (RAM) and may be the type disclosed in Japanese Patent Publication HEI 04-354272.

Various problems have arisen in the conventional types of recursive noise reduction devices. For example, one problem which occurs is that the output data from the output terminal 6 cannot adapt when the image signal data input via the input terminal 1 changes due to, e.g., scene changes or subject movement when in the noise reduction mode (i.e., when 0<K<1). This problem will be explained by considering the recursive noise reduction device shown in FIG. 7 when the multiplication units 2, 3 and the addition unit 4 are an LUT. For simplicity of explanation, both the digital data input via the input terminal 1 and the input/output digital data of the memory 5 are considered to be eight (8) bit data, and each of the data is referred to in decimal notation.

Figure 8:
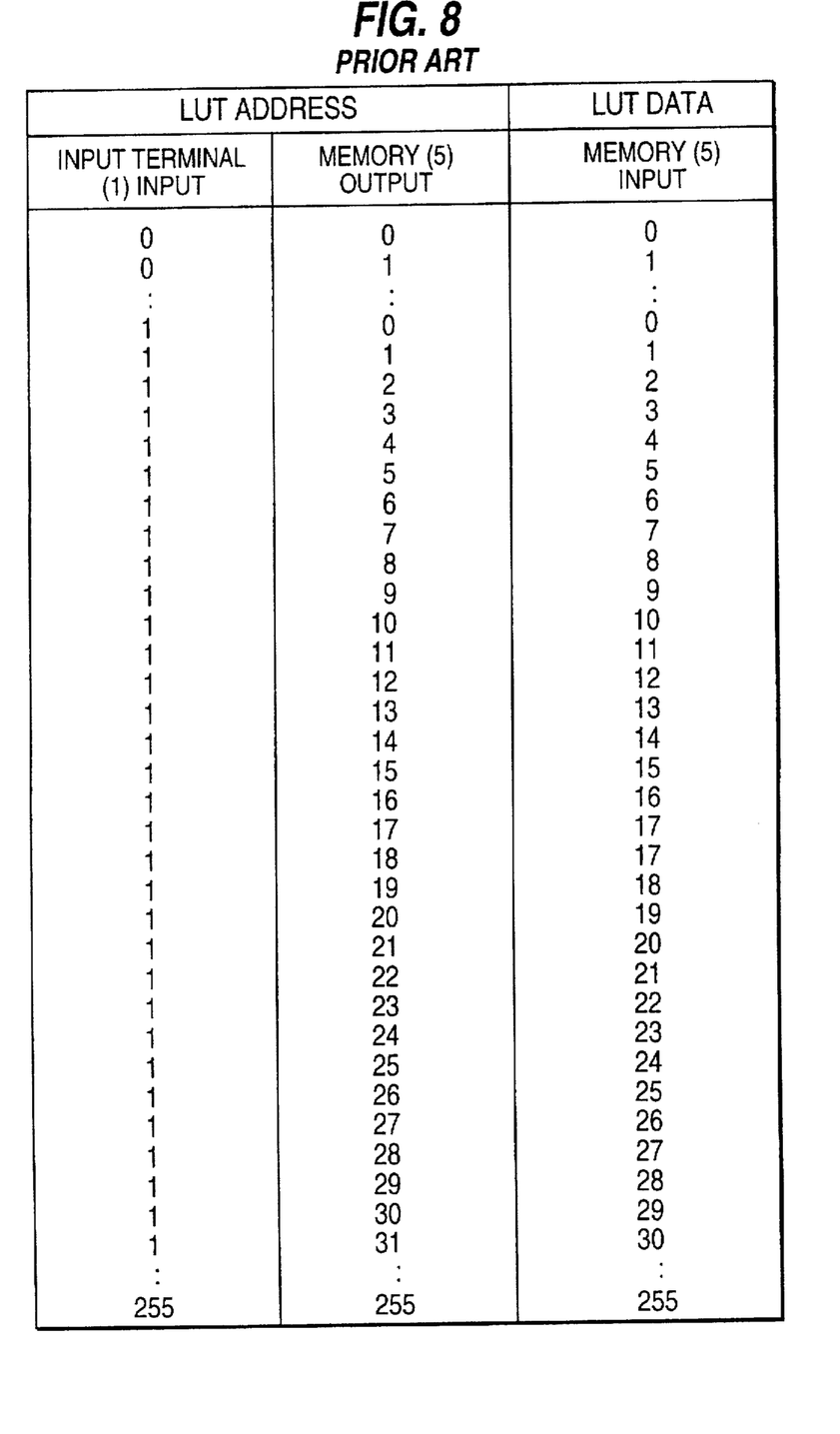
FIG. 8 is a table showing partial contents of a LUT provided in the conventional recursive noise reduction device.

FIG. 8 shows partial contents of the LUT of FIG. 7 when K=1/32. As shown in FIG. 8, the digital data input via the input terminal 1 is input to the higher order address bits of the LUT, and the digital data output from the memory 5 is input to the lower order address bits of the LUT, although the higher and lower order addresses may be reversed. The results computed from the input digital data and the digital data from memory 5 are rounded off to the nearest whole number (i.e., rounded up or rounded down) and are stored in a data section of the LUT. For example, when the digital data which is input via the input terminal 1 is "1", and the digital data which is output from memory 5 is "15", 1×K+15×(1−K)=1×1/32+15×(1−1/32)=14.5625. The value obtained by rounding off to the nearest whole number the computation result "14.5625", specifically "15", is stored at address "115" in the data section of the LUT. As described above, in FIG. 8 each number is represented in decimal notation, but is actually binary digital data.

When the data input via input terminal 1 changes from "15" to "1" due to, for example, a scene change or subject movement, the data "15" is written at this time to the memory 5 from the LUT (FIG. 8) after a first recursive addition. Therefore, during the next recursive addition, in a manner similar to the example described above, the memory 5 output becomes "15", and the data output from the output terminal 6 does not become smaller than "15". However, to adapt to the scene change or subject movement, the memory 5 output must become "1". Thus, the output data cannot adapt to such factors as scene changes and subject movement. More specifically, since the conventional recursive noise reduction device processes value by a standardized method, i.e., rounding up or rounding down to the nearest whole number, the above-noted problems occur and noise reduction cannot be performed.

Furthermore, another problem arise in the conventional recursive noise reduction device because the range of output becomes smaller due to the so-called "rise in the black level" and "drop in the white level". Both the rise in the black level and the drop in the white level are the same phenomenon in principle, and, therefore, the problem of the rise in the black level will be explained using the K=1/32 example.

Figure 9:
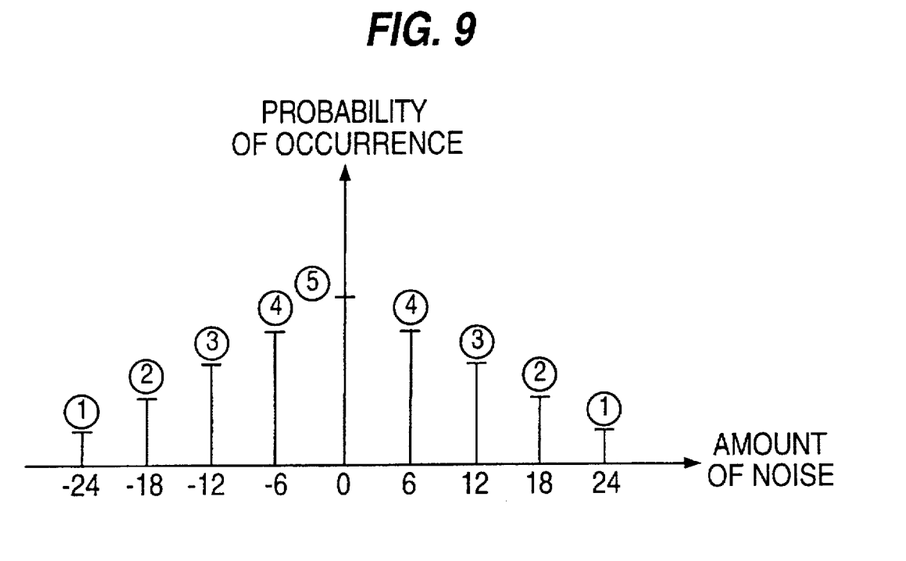
FIG. 9 is a line graph showing an example of a relationship between an amount of noise and its probability of occurrence.

In general, the noise distribution is in the positive direction and the negative direction with respect to the true value (i.e., the value without noise). For example, FIG. 9 shows a line graph of noise distribution where the horizontal axis indicates the amount of noise, and the vertical axis indicates the probability of occurrence. The numbers ①, ②, ③, ④ and ⑤ shown in FIG. 9 illustrate cases where the probability of occurrence of each noise has been normalized using the noise occurrence probability of "±24".

Figure 10:
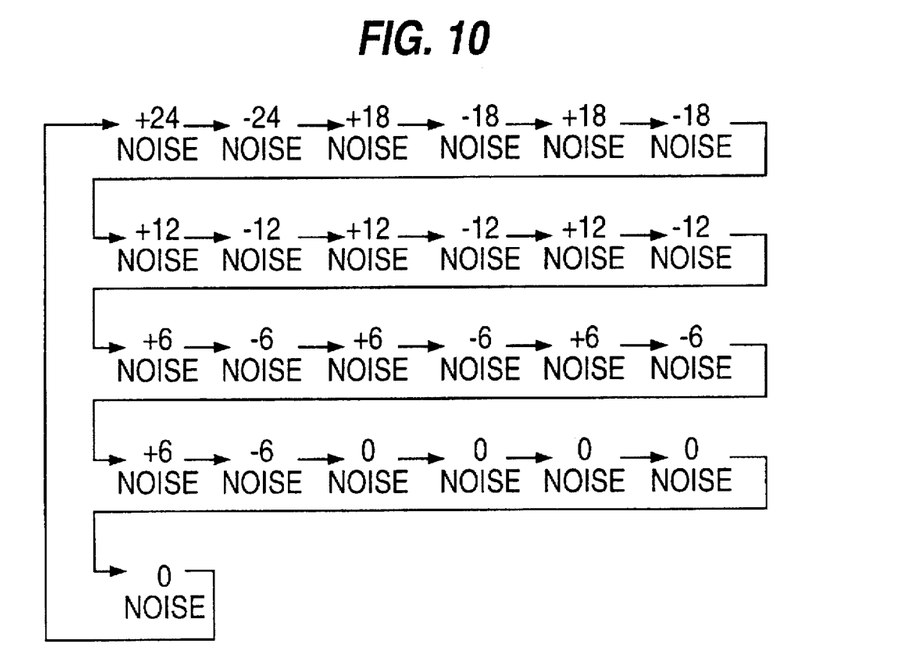
FIG. 10 is a table showing an example of a noise generation pattern.
Figure 11:
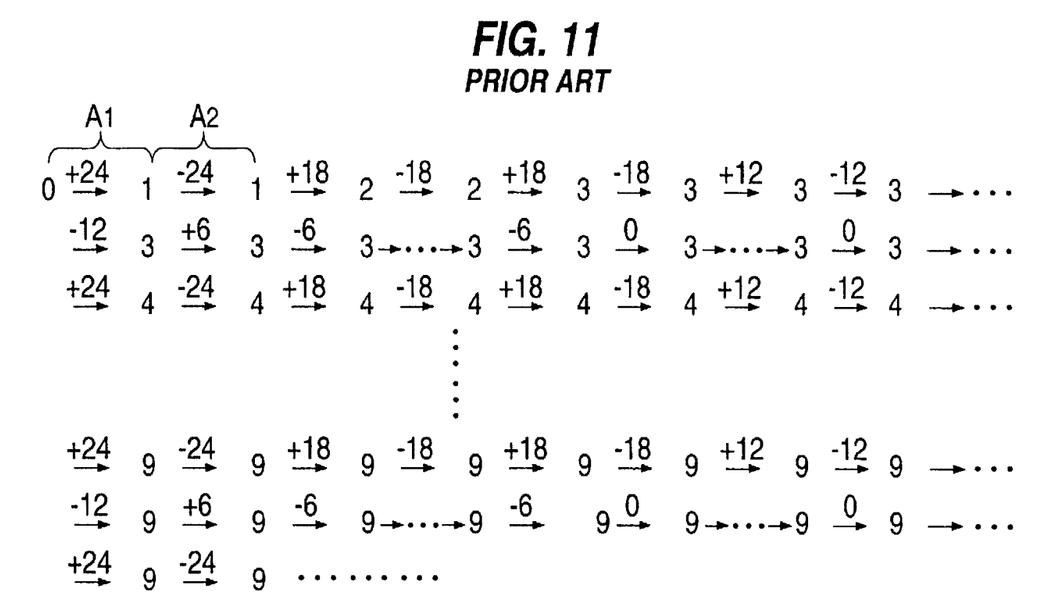
FIG. 11 is a table showing the output data of a conventional recursive noise reduction device when the noise is generated in the pattern shown in FIG. 10.

The noise occurrence sequence is generally random as shown, for example, in the occurrence probabilities of FIG. 9. However, when noise is generated repeatedly, for example, according to the sequence shown in FIG. 10, the output data of output terminal 6 becomes as shown in FIG. 11. Specifically, FIG. 11 shows an example where the true value (value in which there is no noise) is "0". In FIG. 11, the arrows are positioned between the output data of memory 5 and the values shown above each of the arrows between the output data indicate the noise values at the input terminal 1. For example, the first step in FIG. 11 (step $A_1$) shows that where the output of the memory 5 is initially "0", and as a result of noise of "+24" being added to input terminal 1 and recursive addition being performed once, the output of the memory 5 becomes "1". This computation is achieved through the LUT shown in FIG. 8. Next, in step $A_2$, following step $A_1$, the output of memory 5 is "1", and a noise of "−24" is added to the input terminal 1. In this case, it seem that 0−24=−24 will occur in the input terminal 1, but since black-side negative data does not exist, the value at the input terminal 1 becomes 0. Therefore, after the second recursive addition, the output of the memory 5 becomes "1". Thereafter, the output data changes in the manner shown in FIG. 11; however, when the LUT in FIG. 8 is used, when the noise pattern shown in FIG. 10 is repeated a number of times, the output data is finally fixed at "9" even though the true value is "0".

Thus, in the manner described above, with the conventional device, when the signal level from the input terminal 1 is low, a rise in the black level of the output signal occurs. Further, in a similar manner, on the white peak side, when the signal level is high, a drop in the white clip level occurs. As a result of the rise in the black level and the drop in the white level, the output range becomes smaller because the dynamic range of the digital data input to the input terminal 1 is limited and cannot be made unlimited.

SUMMARY OF THE INVENTION

Accordingly, it is an object of the present invention to provide a recursive noise reduction device which solves the above-described problems of conventional recursive noise reduction devices.

It is another object of the present invention to provide a recursive noise reduction device which has adaptability with respect to changes in input image data which are not caused by noise, while performing noise reduction.

It is another object of the present invention to provide a recursive noise reduction device with which a narrowing of the output range due to a rise in the black level or a drop in the white level does not occur.

Additional objects and advantages of the invention will be set forth in part in the description which follows, and, in part, will be obvious from the description, or may learned by practice of the invention.

Objects and advantages of the present invention are achieved by a recursive noise reduction device which ensures adaptability of output data with respect to changes in input digital image data. The recursive noise reduction device includes a storage unit which stores digital image signal in field units or frame units, and a computation unit which recursively determines noise reduction output values. The storage unit stores digital image signals which are a result of the previous recursive calculation by the computation unit. The computation unit performs a recursive calculation by multiplying by (1−K) a digital image signal from the previous recursive calculation which is output from the storage unit, as it multiplies an input image signal by K (where 0<K<1). The computation unit adds the input image signal which has been multiplied by K, to the image signal which has been output from the storage unit and multiplied by (1−K), and the computation results from the addition performed by the computation unit are output via an output terminal as they are written to the storage unit. The recursive noise reduction device also includes a comparison device which compares the input image signal and the image signal from the previous recursive calculation output from the storage unit, and the data written to the storage unit is determined based on the result of the comparison. More specifically, when the comparison device determines that the input image signal is larger than the image signal from the previous recursive calculation output from the storage unit, a value obtained by rounding the computation results upward to the next whole number is output from the output terminal as it is written to the storage unit as the computation result. Conversely, when the comparison device determines that the input image signal is smaller than the image signal from the previous recursive calculation output from the storage unit, a value obtained by rounding the computation result downward to the next whole number is output from the output terminal as it is written to the storage unit as the computation result. When the input image signal and the image signal from the previous recursive calculation are equal, that data itself is written to the storage unit.

Objects and advantages of the present invention are also achieved by a recursive noise reduction device having a storage unit which stores image signals in field units or frame units, and a computation unit comprising a Look-Up Table (LUT). The computation unit multiplies by 1−K an image signal from the previous recursive calculation which is output from the storage unit, as it multiplies the input image signal by K (0<K<1). The computation unit adds the input image signal multiplied by K to the image signal output from the storage unit multiplied by (1−K), and the computation results from the addition by the computation unit are stored in the storage unit.

The input image signal and the image signal output from the storage unit are input to the LUT as address data, and output data from the LUT are the computation results. Specifically, the output data of the LUT are values obtained by rounding the result of the addition of the input image signal and the image signal from the memory upward to the next whole number when the input image signal is larger than the image signal output from the storage unit and, conversely, the output data of the LUT are values obtained by rounding the result of the addition downward to the next whole number when the input image signal is smaller than the image signal output from the storage unit.

For example, when the input data (input image signal) is "1", and the output data of the storage unit is "15", the computation result when K=1/32 becomes 1×K+15×(1−K)= 1×1/32+15×(1−1/32)=14.5625. However, because the input data is smaller than the output data from the storage unit (1<15), the value "14", obtained by rounding the computation result downward to the next whole number, is output from the output terminal as it is written to the storage unit.

Therefore, in accordance with this recursive noise reduction device, when the input image signal and the output from the storage unit differ, the output from the storage unit changes by at least 1 least significant bit (LSB) in the next recursive addition. As a result, simultaneously with noise reduction, adaptability of the output data is ensured with respect to changes in the input image data due to, e.g., scene changes and subject movement. Moreover, a rise in the black level and a drop in the white level are prevented. Further, since the computation unit comprises a "Look-Up Table", only a small number of elements are needed, and the circuit configuration is simplified.

BRIEF DESCRIPTION OF THE DRAWINGS

These and other objects and advantages of the present invention will become apparent and more readily appreciated from the following description of the preferred embodiments, taken in conjunction with the accompanying drawings of which.

DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

The recursive noise reduction device in accordance with the first embodiment of the present invention includes some elements found in the conventional recursive noise reduction device, shown in FIG. 7, and these like elements will be referred to by the same reference numerals. The recursive noise reduction device in accordance with the first embodiment includes an input terminal 1 into which a digitized image signal is input, a memory 5 which stores the digitized image signal from a previous recursive calculation in field units or frame units, and an output terminal 6. The recursive noise reduction device in accordance with the first embodiment also includes a computation unit, for performing multiplication and recursive addition, which comprises a Look-Up Table (LUT).

Figure 1:
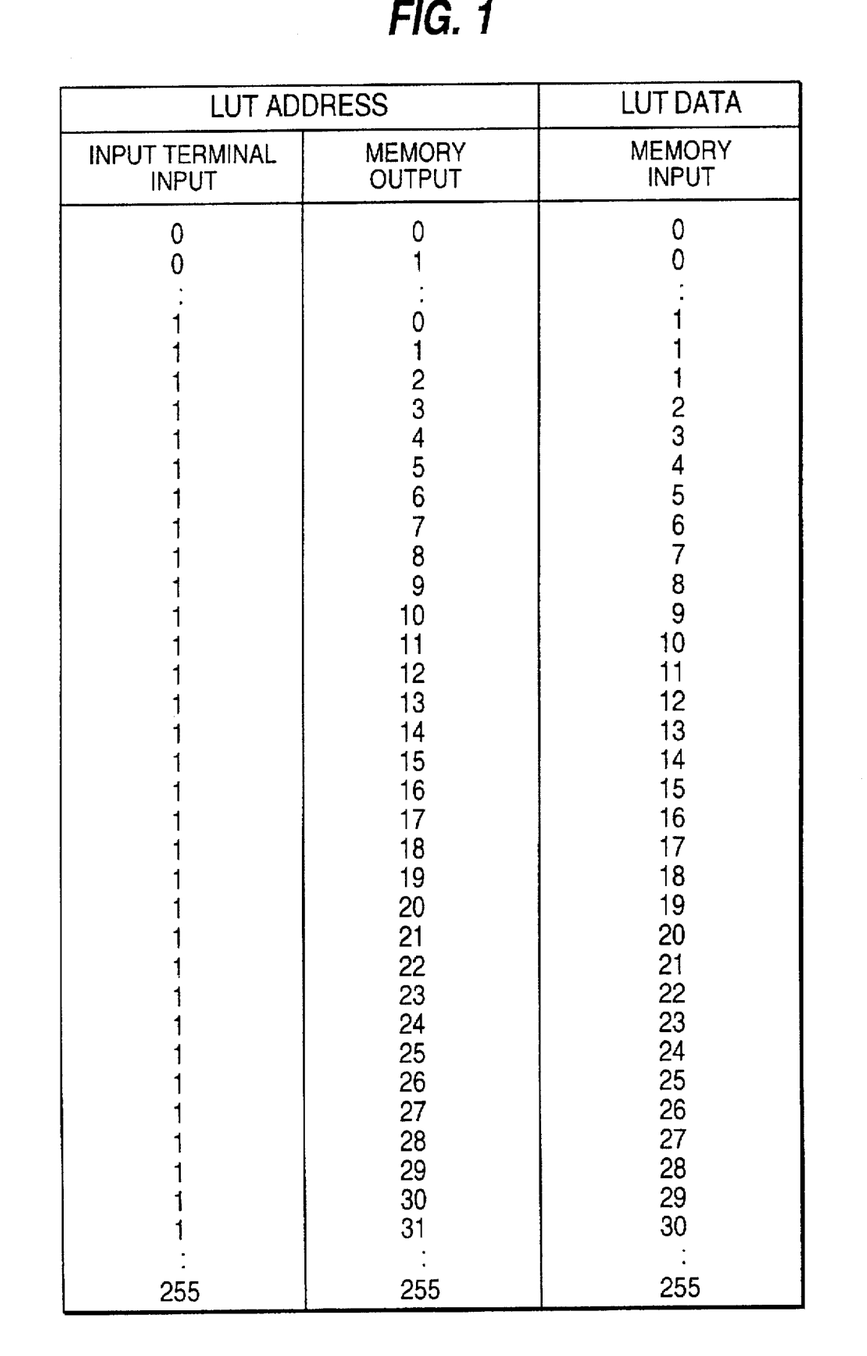
FIG. 1 is a table showing the contents of a LUT of a recursive noise reduction device in accordance with a first embodiment of the present invention.

FIG. 1 is a table showing partial contents of the LUT in accordance with the first embodiment of the present invention. The LUT shown in FIG. 1 differs from the LUT of the conventional device, shown in FIG. 8, in that the output data of the LUT are obtained by rounding the computation results upward to the next whole number when the data input via the input terminal 1 is larger than the output data from the memory 5, and conversely, by rounding the computation results downward to the next whole number when the input data from the input terminal 1 is smaller than the output data from the memory 5. The value of K for the LUT shown in FIG. 1 is 1/32. However, the value of K may be fixed or it may be variable. Further, although the values stored in the LUT are binary digital data, these values are referred to in decimal notation in FIG. 1. Furthermore, the LUT may be stored in read only memory (ROM) or random access memory (RAM).

As can be understood from FIG. 1, for example, when the data input via the input terminal 1 is changed from "15" to "1", the output of the memory 5 is reduced by 1 LSB for each recursive addition, so the 14th recursive addition causes the output data of the memory to become "1".

Therefore, it is possible to adapt to input image scene changes or subject movement even during noise reduction.

The operation of the recursive noise reduction device in accordance with the first embodiment of the invention will be explained in more detail below assuming that noise has been generated in the sequence shown in FIG. 10. When the noise is generated in the sequence shown in FIG. 10, and the data output from the output terminal 6 is computed, even when the signal level from the input terminal 1 is low, the output repeats "0" and "1", which is near the true value of "0". Therefore, a rise in the black level does not occur, as it does in the conventional device, and noise reduction with an output image signal having a large dynamic range is possible. This effect is the same even when the sequence of the input data is changed.

Further, in accordance with the embodiment of the present invention, even with respect to a maximum noise of ±24, a change in output of 1 LSB occurs, and the noise reduction operation is performed.

In the recursive noise reduction device in accordance with the first embodiment of the present invention, the data input via the input terminal 1 and the output data from the memory 5 are compared by the LUT, and the results of the comparison are used to round the computation results upward or downward to the next whole number. However, it is also possible to add an additional "1" to the result which has been rounded upward, and to subtract an additional "1" from the result which has been rounded downward to improve the adaptability of the output data during, e.g., scene changes. As a result, it becomes possible to switch the output screen in a short period of time.

With the conventional recursive noise reduction device disclosed in Japanese Patent Publication No. HEI 04-354272, the data input from an input terminal and the data output from a frame memory are compared, and K is considered to equal 1 when the difference between the data input and the data output is at or above a fixed value which is set in advance. However, because the setting of the fixed value differs according to the S/N ratio of the image input unit connected to the input terminal, a problem occurs in that the fixed value must be set for each of the picture taking conditions. However, the setting of the fixed value is not necessary with the recursive noise reduction device in accordance with the embodiment of the present invention.

Further, it is noted that the image signal may be a brightness signal, a color signal for each of the primary colors (e.g., red, green and blue), or a color difference signal. In the case of a color difference signal, because the black and white levels of the brightness signal correspond to high saturation, the same effect (i.e., noise reduction while preventing a decrease in the dynamic range) is achieved on the high saturation side.

Figure 2:
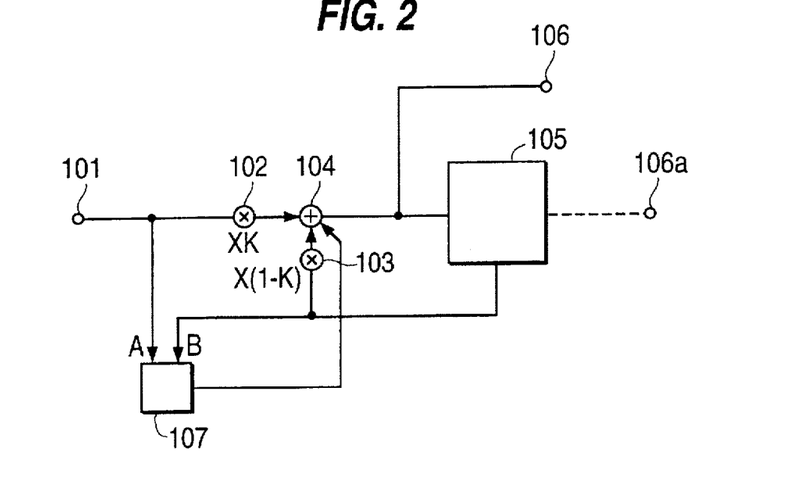
FIG. 2 is a block diagram of a recursive noise reduction device in accordance with a second embodiment of the present invention.

A second embodiment of the present invention will now be described below with reference to FIG. 2. FIG. 2 is a block diagram showing a recursive noise reduction device in accordance with the second embodiment of the present invention. The recursive noise reduction device in accordance with the second embodiment differs from the first embodiment, in which the computation unit comprises a LUT, in that the computation unit comprises multiplication units 102 and 103 and an addition unit 104. Further, the recursive noise reduction device in accordance with the second embodiment includes a comparison device 107 which compares an input digital image signal A, input via an input terminal 101, with a digital image signal B, which is a result of a previous recursive calculation, output from the memory 105.

When the computation unit comprises the multiplication units 102, 103 and the addition unit 104, the coefficient K, the number of bits in (1−K), along with the number of bits output by the multiplication units 102, 103 and the addition unit 104 are affected by the computation accuracy. Accordingly, it is assumed below that at least the calculation results to the left of the decimal point are correct in the output of addition unit 104.

As described above, the comparison circuit 107 compares the digital data input via the input terminal 101 and the output data from the memory 105, and, as a result of the comparison, the comparison circuit 107 outputs "1" only when the input image signal A is greater than output signal B from the memory 105 (A>B). The output value "1" is added as the LSB to the result computed by the addition unit 104 as the computation result, and the data obtained by rounding the computation result upward to the next whole number is written to the memory 105.

When the input image signal A is smaller than the output signal B from the memory 105 (A<B) or when the signal A and B are equal (A=B), the output of the comparison circuit 107 becomes "0". The output value "0" is added to the result computed by the addition unit 104 as the computation result (i.e., the result computed by the addition unit 104 remains as it is), and the data obtained by rounding the computation result downward to the next whole number is written to the memory 105. Image signals from the addition unit 104 may be output directly from output terminal 106, or from an output element 106a via memory 105.

The comparison circuit 107 may be, for example, a subtraction unit which subtracts the input image signal A from the output signal B of the memory 105, and the result of the subtraction may be in twos complement with the sign bit as the output. If this is done, the subtraction result will be a negative value only when A>B, and the sign bit (i.e., the output) will become "1". The comparison device 107 may also be, for example, a well known magnitude comparator.

Further, the inventors have previously proposed, in Japanese Patent Publication No. HEI 04/176019, a device which sets the noise amplification of the output signal to $1/\sqrt{n}$ by gradually making the value of K (K=1/n) smaller according to the number of recursive additions (n), and which is also capable of performing effective noise reduction (the convergence of noise reduction values is fast and the convergence values are small). Embodiments of the present invention are also applicable to this type of device, as will be explained below.

Figure 3:
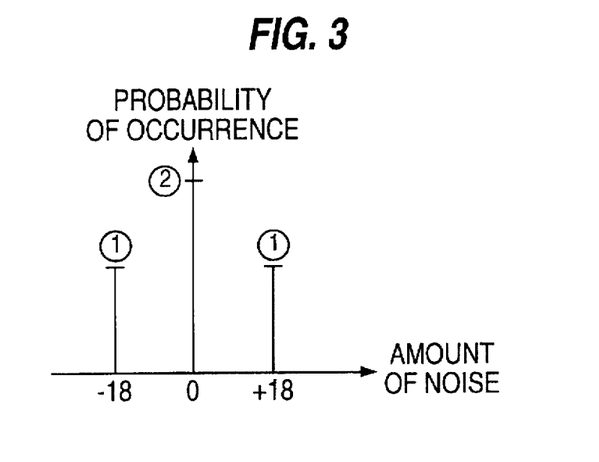
FIG. 3 is a line graph showing an example of a relationship between an amount of noise and its probability of occurrence.
Figure 4:
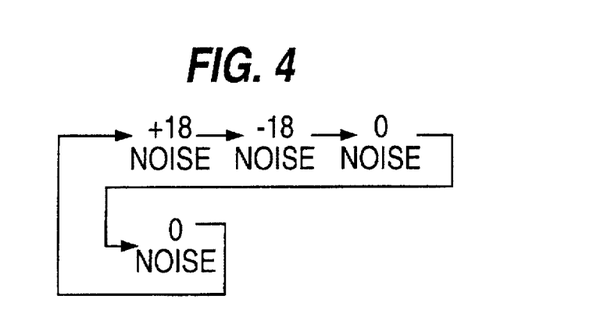
FIG. 4 is a schematic diagram showing an example of a noise generation pattern.

Referring now to FIG. 3 and FIG. 4, the case where noise is generated according to the distribution shown in FIG. 3 and in the sequence or pattern shown in FIG. 4 will be discussed below. With a true value of "0", negative data will be considered to have been clipped to "0". When the output is computed in the manner explained with respect to FIG. 11 for the conventional recursive noise reduction device, even though the true value is "0", the output becomes "8" through multiple recursive additions, and a rise in the black level is generated. However, in accordance with the recursive noise reduction device of the embodiment of the present invention, the output becomes "0" or "1", and a rise in the black level is not generated.

Figure 5:
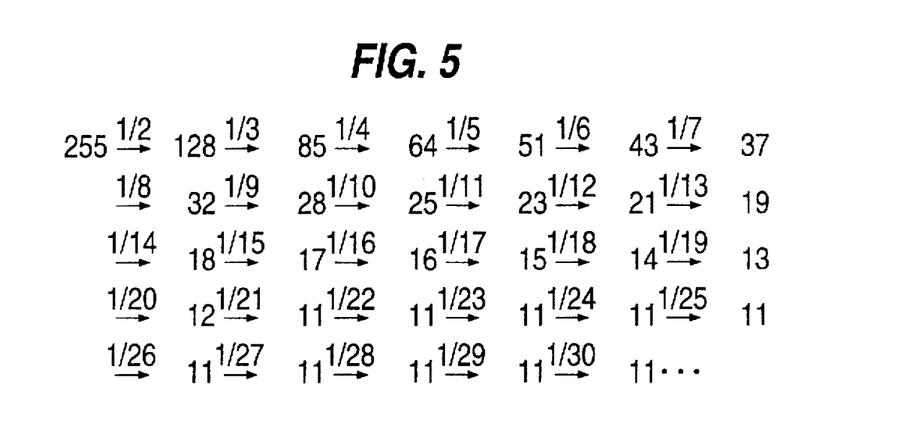
FIG. 5 is a table showing the output data of a conventional recursive noise reduction device when K is variable and when the input data is changed from "225" to "0".
Figure 6:
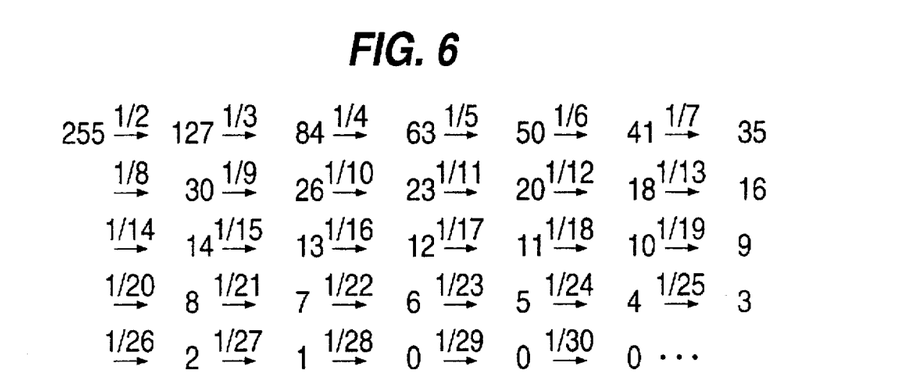
FIG. 6 is a table showing the output data of the recursive noise reduction device in accordance with a preferred embodiment of the present invention when K is variable and when the input data is changed from "225" to "0".

Referring to FIGS. 5 and 6, the case in which the digital input data has been changed from "255" to "0" by a scene change is discussed below. FIG. 5 shows the output results in this case with the conventional noise reduction device when K is variable and is gradually reduced according to the number of recursive additions, and FIG. 6 shows the output results with the noise reduction device in accordance with the embodiment of the present invention when K is variable and is gradually reduced in accordance with the number of recursive additions. In FIGS. 5 and 6, the fractions (e.g., ½, ⅓, ¼, ⅕, etc. ...) above each arrow indicate the value of K. As can be understood from FIGS. 5 and 6, the output is clipped at "11" with the conventional device (FIG. 5), and it does not change all the way to a true value of "0". In contrast, the output data finally becomes "0" in the recursive noise reduction device in accordance with the embodiment of the present invention (FIG. 6).

In the above-described manner, an embodiment of the present invention may be applied to the device previously proposed by the inventors, in which the value of K is gradually reduced according to the number of recursive additions. In the above explanations, the output of the recursive noise reduction device in accordance with the embodiments of the present invention is the input of a frame or field memory, but the same type of results can be achieved when the output of the recursive noise reduction device is the output of a frame or field memory.

As explained above in accordance with the embodiments of the present invention, a recursive noise reduction device is achieved in which there is good adaptability with respect to changes in input image data which is not noise, from causes such as scene changes and subject movement, and in which narrowing of the output range due to a rise in the black level or a drop in the white level do not occur. Accordingly, embodiments of the present invention are particularly effective in cases where the input image is a still image. Moreover, when the input image is a moving image, by using embodiments of the present invention in combination with a motion detection device, at least for the still areas, noise reduction in which narrowing of the output range does not occur becomes possible.

Although preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recursive noise reduction device, comprising:
   a storage unit to store an image signal from a previous recursive calculation;
   a computation unit to recursively calculate a computation result by multiplying an input image signal by K, multiplying by (1−K) an image signal from the previous recursive calculation output from the storage unit, adding the input image signal multiplied by K to the image signal output from the storage unit multiplied by (1−K), and to store the computation result in the storage unit; and
   a comparison device to compare the input image signal with the image signal from the previous recursive calculation output from the storage unit and to output a result of the comparison,
   wherein the computation unit rounds the result of the addition upward to the next whole number as the computation result in response to a result of the comparison indicating that the input image signal is larger than the image signal from the previous recursive calculation output from the storage unit, and rounds the result of the addition downward to the next whole number as the computation result in response to a result of the comparison indicating that the input image signal is smaller than the image signal from the previous recursive calculation output from the storage unit.

2. A recursive noise reduction device as recited in claim 1, wherein the computation unit comprises:

a first multiplication unit to multiply the input image signal by K;

a second multiplication unit to multiply the image signal from the previous recursive calculation by 1−K; and an addition unit to add results of the multiplication by the first and second multiplication units.

3. A recursive noise reduction device as recited in claim 1, wherein the comparison device outputs a "1" to the addition unit when the input image signal is larger than the image signal output from the storage unit, and the comparison device outputs a "0" to the addition unit when the input image signal is smaller than the image signal output from the storage unit.

4. A recursive noise reduction device as recited in claim 3, wherein the "1" output to the addition unit is added to the result of the addition of the input image signal and the output image signal from the storage unit, and a result is rounded up to the next whole number.

5. A recursive noise reduction device as recited in claim 3, wherein the comparison device is a subtraction unit which subtracts the input image signal from the image signal output from the storage unit and a sign bit of a result of the subtraction is output to the addition unit to indicate a result of the comparison.

6. A recursive noise reduction device, comprising:

a storage unit to store an image signal from a previous recursive calculation;

a computation unit to multiply an input image signal by K, to multiply by (1−K) an image signal from the previous recursive calculation output from the storage unit, to add the input image signal multiplied by K to the image signal output from the storage unit multiplied by (1−K), and to store a computation result in the storage unit, wherein the computation unit includes a look-up table having input values which are the input image signal and the image signal output from the storage unit, and wherein the look-up table outputs to the storage unit, as the computation result, a result of the addition rounded upward to the next whole number when the input image signal is larger than the image signal output from the storage unit, and outputs to the storage unit as the computation result, a result of the addition rounded downward to the next whole number when the input image signal is smaller than the image signal output from the storage unit.

7. A recursive noise reduction device as recited in claim 6, wherein a "1" is added to the computation result rounded upward and a "1" is subtracted from the computation result rounded downward.

8. A recursive noise reduction device, comprising a memory to store digital image data from a previous recursive calculation; and a computation unit to receive input digital image data and digital image data from a previous recursive calculation stored in the memory, to recursively calculate an output value based on the input digital image data and the digital image data received from the memory, and to round the output value based on the relative levels of the input digital image data and the digital image data received from the memory.

9. A recursive noise reduction device as recited in claim 8, wherein the computation unit rounds the output value up to a nearest whole number when the input digital image data is larger than the digital image data received from the memory, and rounds the output value down to a nearest whole number when the input digital data is smaller than the digital image data received from the memory.

10. A recursive noise reduction device as recited in claim 9, wherein the rounded output value is stored in the memory.

11. A recursive noise reduction device as recited in claim 8, wherein the computation unit comprises a look-up table.

12. A recursive noise reduction device as recited in claim 8, wherein the computation unit comprises a first multiplication unit, a second multiplication unit and an addition unit.

13. A recursive noise reduction device as recited in claim 11, wherein the input digital image data and the digital image data received from the memory are input as an address of the look-up table and an output of the look-up table is the rounded output value.

14. A recursive noise reduction device as recited in claim 8, wherein the computation unit comprises a comparator to compare the input digital data and the digital image data received from the memory, to output a signal indicating to round the output value up when the input digital image data is larger than the digital image data stored in the memory, and to output a signal indicating to round the output value down when the input digital image data is smaller than the digital image data received from the memory.

15. A method for performing recursive noise reduction, comprising:

receiving first digital image data;

receiving second digital image data from a previous recursive calculation;

multiplying the first digital image data by a first coefficient to produce a first product;

multiplying the second digital image data by a second coefficient to produce a second product;

adding the first product to the second product to produce a sum;

comparing the first digital image data to the second digital image data;

rounding the sum up to a nearest whole number when the first digital image data is larger than the second digital image data; and rounding the sum down to a nearest whole number when the first digital image data is smaller than the second digital image data.

* * * * *

UNITED STATES PATENT AND TRADEMARK OFFICE
CERTIFICATE OF CORRECTION

PATENT NO. : 5,719,793
DATED : February 17, 1998
INVENTOR(S) : Keiichi NITTA, et al.

It is certified that error appears in the above-identified patent and that said Letters Patent is hereby corrected as shown below:

TITLE PAGE, [56] References Cited, ADD --5,173,776 12/1992 Rigg et al.--.

Signed and Sealed this

Eleventh Day of August 1998

Attest:

BRUCE LEHMAN

*Attesting Officer*       *Commissioner of Patents and Trademarks*